United States Patent
Gao et al.

(10) Patent No.: US 10,459,814 B2
(45) Date of Patent: Oct. 29, 2019

(54) DRIVE EXTENT BASED END OF LIFE DETECTION AND PROACTIVE COPYING IN A MAPPED RAID (REDUNDANT ARRAY OF INDEPENDENT DISKS) DATA STORAGE SYSTEM

(71) Applicant: EMC IP Holding Company LLC, Hopkinton, MA (US)

(72) Inventors: Hongpo Gao, Beijing (CN); Jamin Kang, Beijing (CN); Jian Gao, Beijing (CN); Shaoqin Gong, Beijing (CN); Ree Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 15/808,119

(22) Filed: Nov. 9, 2017

(65) Prior Publication Data
US 2019/0129815 A1     May 2, 2019

(30) Foreign Application Priority Data
Oct. 31, 2017   (CN) .......................... 2017 1 1050623

(51) Int. Cl.
  G06F 11/20     (2006.01)
  G06F 3/06      (2006.01)
  G06F 11/10     (2006.01)
(52) U.S. Cl.
  CPC ........ G06F 11/2094 (2013.01); G06F 3/0616 (2013.01); G06F 3/0644 (2013.01);
(Continued)

(58) Field of Classification Search
  CPC .... G06F 3/0616; G06F 3/0644; G06F 3/0647; G06F 3/0689; G06F 11/1076;
(Continued)

(56) References Cited

U.S. PATENT DOCUMENTS 8,463,992 B2    6/2013  Kelton et al.
8,621,271 B2 *  12/2013 Grube ................... G06F 3/0619
                                           714/6.32
(Continued)

OTHER PUBLICATIONS

Bairavasundaram, et al., "An Analysis of Latent Sector Errors in Disk Drives", SIGMETRICS '07, Jun. 12-16, 2007, ACM, San Diego, California, 2007, 12 pages.
(Continued)

Primary Examiner — Joseph R Kudirka
(74) Attorney, Agent, or Firm — BainwoodHuang

(57) ABSTRACT

Mapped RAID (Redundant Array of Independent Disks) technology divides individual drives into multiple drive extents, allocates the drive extents to RAID extent entries in a RAID mapping table, and performs "end of life" detection and proactive copying of data between data storage drives on a per drive extent basis. A given drive extent is determined to be "end of life" when the ratio of soft media errors to total I/O operations for the drive extent exceeds a threshold error ratio. Data stored on the drive extent is then proactively copied to a newly allocated drive extent, the RAID mapping table is modified so that the data is subsequently accessed from the newly allocated drive extent, and the drive extent is excluded from being used again to store host data. As a result, the rate at which the drives experience soft media errors is slowed, lengthening their effective life.

19 Claims, 8 Drawing Sheets

(52) U.S. Cl.
CPC .......... *G06F 3/0647* (2013.01); *G06F 3/0689* (2013.01); *G06F 11/1084* (2013.01)

(58) Field of Classification Search
CPC ............. G06F 11/1084; G06F 11/2094; G06F 2201/805; G06F 2201/82; G11B 20/1883; G11B 2020/1893; G11B 2020/1896; G11C 29/70; G11C 29/838
USPC ........................ 714/6.13, 6.22–6.3, 763, 764
See application file for complete search history.

(56) References Cited

U.S. PATENT DOCUMENTS

| | | | |
|---|---|---|---|
| 10,013,321 B1 * | 7/2018 | Stern | G06F 11/2069 |
| 2004/0260967 A1 | 12/2004 | Guha et al. | |
| 2006/0075283 A1 | 4/2006 | Hartung et al. | |
| 2008/0256427 A1 | 10/2008 | He et al. | |
| 2015/0067244 A1 * | 3/2015 | Kruger | G06F 12/0246 |
| | | | 711/103 |

OTHER PUBLICATIONS

Miller, Scott A., "Comparing RAID 10 and Raid 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

* cited by examiner

DRIVE EXTENT BASED END OF LIFE DETECTION AND PROACTIVE COPYING IN A MAPPED RAID (REDUNDANT ARRAY OF INDEPENDENT DISKS) DATA STORAGE SYSTEM

TECHNICAL FIELD

The present disclosure relates generally to intelligent data storage systems that provide RAID (Redundant Array of Independent Disks) data storage technology, and more specifically to technology for drive extent based end of life detection and proactive copying for data storage drives in a mapped RAID data storage system.

BACKGROUND

Data storage systems are arrangements of hardware and software that typically include one or more storage processors coupled to arrays of non-volatile data storage drives, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted in accordance with the received I/O operations. The storage processors run software that manages incoming I/O operations and performs various data processing tasks to organize and secure the host data that is received from the host machines and then stored on the non-volatile data storage devices.

Some previous data storage systems have provided traditional RAID (Redundant Array of Independent Disks) technology. Traditional RAID is a data storage virtualization/protection technology that can be used to combine multiple physical drives into a single logical unit to provide data redundancy and/or performance improvement. Data may be distributed across the drives in one of several ways, referred to as RAID levels or configurations, depending on the required levels of redundancy and performance. Some RAID levels employ data striping ("striping") to improve performance. In general, striping involves segmenting received host data into logically sequential blocks (e.g. sequential blocks of an address space of a logical storage object), and then storing data written to consecutive blocks in the logical sequence of blocks onto different drives. A series of consecutive logically sequential data blocks that are stored across different drives is sometimes referred to as a RAID "stripe". By spreading data segments across multiple drives that can be accessed concurrently, total data throughput can be increased.

Some RAID levels employ a "parity" error protection scheme to provide fault tolerance. When a RAID level with parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

Some storage processors in previous data storage systems have been operable to perform certain actions in response to the receipt of certain error indications from the non-volatile data storage devices contained in or attached to the data storage system. In particular, some previous storage processors have been operable to receive an error message from a data storage drive indicating that the status of the entire data storage drive is "end of life", and that therefore the drive itself should be replaced. Some data storage drives operate by using an internal set of reserved sectors to transparently replace sectors that fail while I/O operations directed to the data storage drive are being processed. Each time a reserved sector is allocated by the data storage drive to replace a failed sector, the data storage drive successfully completes the requested I/O operation that caused the failure using the replacement sector, and then reports a completion status indicating that a "soft media error" has occurred. When the data storage drive has allocated all of its reserved sectors to replace failed sectors, the data storage drive may send an error message to the storage processor indicating that the status of the data storage drive is "end of life". Previous storage processors have responded to receipt of an "end of life" message from a data storage drive by copying the entire set of data stored on the "end of life" data storage drive to a replacement data storage drive.

Unfortunately, as the capacity of modern hard disks has increased significantly over time, responding to receipt of an "end of life" message from a data storage drive by copying the entire set of data stored on the data storage drive to a single healthy data storage drive has become a prohibitively time consuming and resource intensive operation for storage processors in data storage systems.

SUMMARY

The mapped RAID technology described herein provides improvements with regard to the technical shortcomings of previous data storage systems that used traditional RAID technology. In contrast to the mapped RAID technology described herein, previous data storage systems that used traditional RAID have exhibited significant limitations with regard to the ability to add new disks, and with regard to the amount of time required to rebuild data onto a replacement disk in the event of a disk failure. For example, traditional RAID systems have not supported the addition of new disks on an individual disk basis, but have instead required that new storage capacity be added only in increments equal to the minimum number of disks that is required to support the specific RAID configuration, i.e. a number of disks equal to the width of the RAID stripe being used. Accordingly, for 4D+1P RAID-5 configurations, new disks could only be added to a traditional RAID system in increments of five disks at a time. For 4D+2P RAID-6 configurations, new disks could only be added to traditional RAID systems in increments of six disks. As the capacity of individual disks has increased over time with the introduction of new storage technologies, this inflexibility of traditional RAID systems with regard to adding new capacity has become increasingly burdensome and impractical.

In another example, as the total capacity of individual disks has increased, the amount of time required by traditional RAID systems to rebuild data of an entire failed disk onto a single spare disk has also increased, and the write bandwidth of the single spare disk has become a significant performance bottleneck with regard to total rebuild time. Moreover, while data previously stored on the failed disk is being rebuilt onto the spare disk, concurrent failure of one or more additional disks in a traditional RAID system during the rebuilding process may introduce the risk of data loss.

The mapped RAID technology described herein improves on traditional RAID technology by allowing for the addition of individual non-volatile data storage drives to a data storage system in order to increase the storage capacity of the system, and also addresses the problem of long rebuild times in traditional RAID caused by write bandwidth bottlenecks when writing to dedicated spare disks. In the mapped RAID technology described herein, each data storage drive is divided into multiple contiguous regions of non-volatile data storage referred to as "drive extents" that are allocated from a drive extent pool. A RAID mapping table contains a number of RAID extent entries, each one of which indicates a set of drive extents that have been allocated to that RAID extent entry, and that are used to store host data written to a corresponding RAID extent located within a logical address space representing the non-volatile storage represented by the RAID mapping table. Each RAID extent entry in the RAID mapping table indicates a unique set of drive extents allocated from the drive extent pool, and each drive extent allocated to a given RAID extent must be located on a different data storage drive. In this way, the drive extents indicated by a RAID extent entry are used to store the blocks of data and parity information for a stripe of non-volatile data storage represented by the RAID extent entry. Accordingly, the total number of drive extents indicated by each RAID extent entry in the RAID mapping table may be the same as the number of disks used in a traditional RAID system to store data blocks and parity information for the same RAID level. For example, in a mapped RAID system supporting a 4D+1P RAID-5 configuration, each RAID extent entry in the RAID mapping table indicates a total of five drive extents that are used to store the four blocks of host data, as well as the parity information block of the stripe represented by the RAID extent. In a 4D+2P RAID-6 mapped RAID configuration, two parity information blocks are indicated by each RAID extent entry to provide an increased level of fault tolerance, and each RAID extent entry in the RAID mapping table indicates a total of six drive extents.

In the event that a drive fails in a mapped RAID system, spare drive extents can be allocated that are located on multiple data storage drives that contribute to the drive extent pool in order to replace the drive extents from the failed drive, thus advantageously increasing parallel processing by spreading the rebuild read and write operations across multiple data storage drives, and effectively eliminating the write bandwidth bottleneck previously caused by traditional RAID's reliance on rebuilding to a single spare disk. In this way, mapped RAID can generally reduce rebuild time in the face of a single drive failure. Moreover, as the number of data storage drives being used increases, the amount of concurrent processing that can be occur during the rebuild process may also increase, generally resulting in progressive improvement in rebuild performance for increasing numbers of data storage drives that contribute to the drive extent pool.

In addition to the above described improvements over traditional RAID provided by the disclosed mapped RAID technology in terms of supporting the addition of individual non-volatile data storage drives and reducing data rebuild times, the technology disclosed herein further provides improvements with regard to the time consuming and resource intensive operation of previous storage systems that copied the entire set of data stored on a data storage drive to a single healthy drive in response to receipt of an "end of life" message from the drive. The disclosed technology advantageously performs "end of life" detection and proactive copying of host data on a per drive extent basis. By performing "end of life" detection and proactive copying on a per drive extent basis, the disclosed storage processor technology advantageously copies a relatively small amount of data each time a drive extent is determined by the storage processor to be at its "end of life". As a result, the time required and resources utilized for the proactive copying performed for each drive extent determined to be "end of life" error is relatively small, thus improving overall storage system performance. In addition, because failing sectors on a data storage drive are likely to be located in close physical proximity to each other within the drive, and because each drive extent in the disclosed system contains multiple sectors, by proactively copying data on a drive extent basis in response to detecting the "end of life" status of individual drive extents, the disclosed technology preempts the need for the drive to replace sectors within each "end of life" drive extent that have not yet failed but are likely to fail, due to their proximity to the previously failed sectors that caused the drive extent to be identified as "end of life". In this way, the disclosed technology avoids the need for the data storage drive to use reserved sectors to replace sectors that are physically proximate to the previously failed sectors within an "end of life" drive extent, which are likely to fail if they continue to be used, but which will not be used to store host data in the disclosed technology after the drive extent is determined to be "end of life". The disclosed technology accordingly reduces the overall rate at which reserved sectors within each data storage drive are consumed as the result of soft media errors, thus potentially lengthening the effective life of each one of the drives in the data storage system.

In the disclosed technology, RAID (Redundant Array of Independent Disks) data protection is provided for at least one storage object, such as a logical disk ("LUN"), in a data storage system. The data storage system includes at least one storage processor and an array of data storage drives that are communicably coupled to the storage processor. During operation, the disclosed technology generates a RAID mapping table that contains multiple RAID extent entries. Each RAID extent entry contained in the RAID mapping table indicates a predetermined total number of drive extents, and the drive extents indicated by each RAID extent entry are used to persistently store host data written to a corresponding one of a plurality of RAID extents within a logical address space that is mapped to the storage object. Each drive extent is a unique contiguous region of non-volatile data storage located on one of the data storage drives, and each data storage drive has multiple drive extents located thereon.

For each host I/O operation directed to the storage object, the storage processor may perform a monitoring operation that includes: i) incrementing a total I/O operations counter corresponding to a target drive extent to which the I/O operation is directed, where the total I/O operations counter corresponding to the target drive extent stores a total number of I/O operations that have been directed to the target drive extent, ii) receiving, from a data storage drive within which the target drive extent is located, a completion status for the I/O operation, and iii) in response to detecting that the received completion status for the I/O operation indicates that a soft media error occurred within the data storage drive while performing the I/O operation on the target drive extent:

a) incrementing a soft media error counter corresponding to the target drive extent, the soft media error counter corresponding to the target drive extent storing a total number of soft media errors that have occurred while performing I/O operations on the target drive extent, b) calculating an error ratio for the target drive extent, the error ratio for the target drive extent being equal to a ratio of a current value of the soft media error counter corresponding to the target drive extent to a current value of the total I/O operations counter corresponding to the target drive extent, and c) in response to detecting that the error ratio for the target drive extent exceeds a threshold error ratio, performing a proactive copy operation on the target drive extent that copies all host data stored on the target drive extent to a newly allocated drive extent, such that performing the proactive copy operation on the target drive extent also modifies a RAID extent entry in the RAID mapping table that stored an indication of the target drive extent to store an indication of the newly allocated drive extent, so that the host data copied from the target drive extent to the newly allocated drive extent is subsequently accessed by subsequently received I/O operations on the newly allocated drive extent.

In some embodiments, performing the proactive copy operation on the target drive extent may further include setting a "dead flag" corresponding to the target drive extent, and the disclosed technology further operates to prevent the target drive extent from subsequently being allocated to any RAID mapping table entry in the RAID mapping table in response to the dead flag corresponding to the target drive extent being set.

In some embodiments, an "end of life" indication may be received from the data storage drive, and in response to receipt of the end of life indication from the data storage drive, proactive copy operations may be performed on all drive extents that are located within the data storage drive, the proactive copy operations copying only host data stored on those drive extents located within the data storage drive that are indicated by RAID extent entries in the RAID mapping table (i.e. that have previously been allocated to RAID extent entries in the RAID mapping table), to newly allocated drive extents, and the proactive copy operations also modifying the RAID extent entries in the RAID mapping table that stored indications of drive extents located within the data storage drive to store indications of the newly allocated drive extents, such that the host data copied from the drive extents located within the data storage drive that were indicated by RAID extent entries in the RAID mapping table to the newly allocated drive extents is accessed by subsequently received I/O operations on the newly allocated drive extents.

In some embodiments, performing proactive copy operations on all drive extents located within the data storage drive further includes setting a dead flag corresponding to each one of the drive extents located within the data storage drive, and the disclosed technology further operates to, in response to detecting that the dead flag corresponding to each one of the drive extents located within the data storage drive is set, prevent the drive extents located within the data storage drive from subsequently being allocated to any RAID mapping table entry in the RAID mapping table.

In some embodiments, performing the proactive copy operation on the target drive extent further includes i) setting an "end of life flag" corresponding to the target drive extent, ii) detecting, by a background process, that the end of life flag corresponding to the target drive extent is set, and iii) in response to detecting that the end of life flag corresponding to the target drive extent is set, copying, by the background process, all the host data stored on the target drive extent to the newly allocated drive extent, and modifying, by the background process, the RAID extent entry in the RAID mapping table that stored an indication of the target drive extent to store an indication of the newly allocated drive extent.

In some embodiments, performing the proactive copy operation on all drive extents located within the data storage drive further includes setting an end of life flag corresponding to each one of the drive extents that are located within the data storage drive and are also indicated by RAID extent entries in the RAID mapping table and detecting, by a background process, that the end of life flags corresponding to the drive extents located within the data storage drive that are also indicated by RAID extent entries in the RAID mapping table are set. In response to detecting, by the background process, that the end of life flags are set corresponding to the drive extents located within the data storage drive that are also indicated by RAID extent entries in the RAID mapping table, the background process copies all the host data stored on the drive extents that are located within the data storage drive and that are also indicated by RAID extent entries in the RAID mapping table to the newly allocated drive extents, and modifies each one of the RAID extent entries in the RAID mapping table that stored an indication of one of the drive extents located within the data storage drive to store an indication of one of the newly allocated drive extents.

In some embodiments, the data storage drive within which the target drive extent is located includes a set of reserved disk sectors that are used to replace failed disk sectors, and the received completion status for the I/O operation that a indicates that a soft media error occurred within the data storage drive while performing the I/O operation on the target drive extent indicates that one of the set of reserved disk sectors was used to replace an original disk sector to which the I/O operation was directed within the target drive extent, in response to a failure of the original disk sector.

In some embodiments, the end of life indication received from the data storage drive indicates that a threshold maximum number of the reserved disk sectors have been used to replace original disk sectors to which I/O operations were directed, in response to failures of the original disk sectors. For example, the threshold maximum number of the reserved disk sectors may be all of the reserved disk sectors in the data storage drive.

It will be evident to those skilled in the art that embodiments of the disclosed technology may provide significant improvements with regard to technical shortcomings of previous storage systems. For example, the disclosed mapped RAID technology may provide improvements over traditional RAID systems in terms of supporting the addition of individual non-volatile data storage drives and reducing data rebuild times. In another example, the disclosed technology may improve overall storage system performance by performing "end of life" detection and proactive copying of host data on a per drive extent basis, which advantageously copies a relatively small amount of data each time a drive extent is determined to be at its "end of life", so that the time required and resources utilized for the proactive copying performed to process each drive extent that is determined to be "end of life" error is relatively small. Since failing sectors on a data storage drive are likely to be located in close physical proximity to each other within the drive, and because each drive extent contains multiple sectors, by proactively copying data on a drive extent basis in response to detecting the "end of life" status of individual drive extents, the disclosed technology preempts the use of reserved sectors to replace sectors within each "end of life" drive extent that have not yet failed but are likely to fail, due to their proximity to the previously failed sectors that caused the drive extent to be identified as "end of life". The disclosed technology may therefore avoid the need for the data storage drive to use reserved sectors to replace healthy sectors that are physically near the previously failed sectors within an "end of life" drive extent, which are likely to fail if they continue to be used, but which will not be used to store host data in the disclosed system after the drive extent is determined to be "end of life". In this way the disclosed technology reduces the overall rate at which reserved sectors within each data storage drive are consumed to handle soft media errors, and may therefore potentially lengthen the effective life of individual data storage drives.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
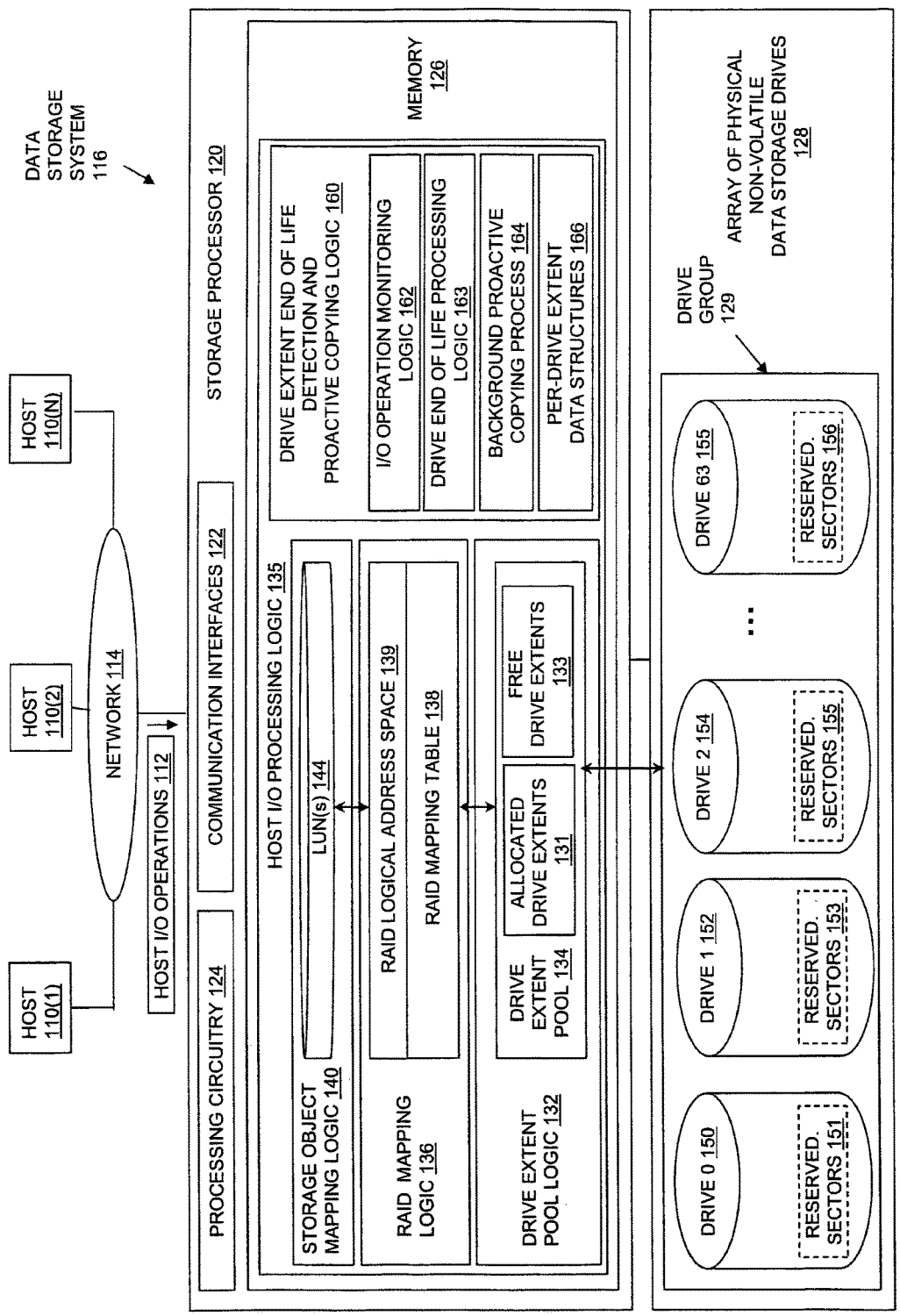
FIG. 1 is a block diagram showing an operational environment for the disclosed technology, including an example of a data storage system in which the disclosed technology may be embodied.

FIG. 1 is a block diagram showing an example of an operational environment for the disclosed technology, including an example of a data storage system in which the disclosed technology may be embodied. The data storage environment of FIG. 1 includes some number of Host Computing Devices 110, referred to as "hosts" and shown for purposes of illustration by Hosts 110(1) through 110(N), that access non-volatile data storage provided by Data Storage System 116, for example over one or more computer networks, such as a local area network (LAN), and/or a wide area network (WAN) such as the Internet, etc., shown for purposes of illustration in FIG. 1 by Network 114. Data Storage System 116 includes at least one Storage Processor 120 and an Array of Physical Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Physical Non-Volatile Data Storage Drives 128 may include data storage drives such as magnetic disk drives, solid state drives, hybrid drives, and/or optical drives. In the example of FIG. 1, Array of Physical Non-Volatile Data Storage Drives 128 includes at least one group of data storage drives, shown by Drive Group 129. Drive Group 129 includes, for example, sixty four data storage drives, shown by Drive 0 150, Drive 1 152, Drive 2 154, and so on through Drive 63 155. Each one of the data storage drives in Drive Group 129 initially reserves within it a set of sectors that it subsequently uses to transparently replace sectors that fail while I/O operations directed to the drive are being processed within the data storage drive. In the example of FIG. 1, Drive 0 150 initially reserves Reserved Sectors 151, Drive 1 152 initially reserves Reserved Sectors 153, Drive 2 154 initially reserves Reserved Sectors 155, and so on through Drive 63 155, which initially reserves Reserved Sectors 156. When one of the data storage drives in Drive Group 129 detects a failure of a sector while processing an I/O operation, it allocates one of its reserved sectors and creates an internal mapping that replaces the failed sector with the allocated reserved sector within an address space of the drive. The drive then completes the I/O operation using the allocated reserved sector, and returns a completion status that indicates "soft media error" to the Storage Processor 120, which indicates to the Storage Processor 120 that although the I/O operation was successfully completed, a "soft media error" occurred while the I/O operation was being processed. Accordingly, each time one of the data storage drives in the Drive Group 129 issues a completion status that indicates a "soft media error" for an I/O operation, that is an indication to the Storage Processor 120 that one of the reserved sectors for that drive was consumed while processing an I/O operation.

When any one of the data storage drives contained in Drive Group 129 reaches a point at which it has allocated all or nearly all of its reserved sectors to replace previously failed sectors, the drive will issue a message to the Storage Processor 120 indicating that the drive has entered an "end of life" state, and should therefore be replaced. For example, in some embodiments, individual ones of the data storage drives contained in Drive Group 129 may convey an end of life indication to the Storage Processor 120 when a threshold maximum number of the reserved disk sectors in the respective drive have been used to replace original disk sectors to which I/O operations were directed, in response to failures of the original disk sectors. For example, the threshold maximum number of the reserved disk sectors for a data storage drive may be a number equal to the total number of the sectors reserved by the data storage drive. Alternatively, the threshold maximum number of the reserved disk sectors for a data storage drive may be a number equal to a large percentage of the total number of the disk sectors reserved by the data storage drive, e.g. a number equal to ninety percent of the total number of the disk sectors reserved by the data storage drive, etc.

Array of Physical Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, other processes, etc.

During operation, Drive Extent Pool Logic 132 generates Drive Extent Pool 134 by dividing each one of the data storage drives in Drive Group 129 into multiple, equal size drive extents, each one of which consists of a physically contiguous range of non-volatile data storage located on a single drive. For example, Drive Extent Pool Logic 132 may divide each one of the data storage drives in Drive Group 129 into a fixed number of equal size drive extents of physically contiguous non-volatile storage, and add an indication (e.g. a drive index and a drive extent index, etc.) of each one of the resulting drive extents to Drive Extent Pool 134. The size of the drive extents into which the physical drives in Drive Group 129 are divided is the same for every data storage drive. Various specific fixed sizes of drive extents may be used in different embodiments. For example, in some embodiments each drive extent may have a size of 10 gigabytes. Larger or smaller drive extent sizes may be used in alternative embodiments.

Drive extents are allocated from Drive Extent Pool 134 to specific RAID extent entries contained in the RAID Mapping Table 138. For example, each row of RAID Mapping Table 138 may consist of a RAID extent entry to which drive extents may be allocated. RAID Logical Address Space 139 is made up of RAID extents, and the drive extents allocated to each individual RAID extent entry are each used to store host data directed to a corresponding one of the RAID extents within RAID Logical Address Space 139. For example, a drive extent may be allocated from Drive Extent Pool 134 to a specific RAID extent entry contained in RAID Mapping Table 138 in response to an allocation request (e.g. from RAID Mapping Logic 136), and subsequently be used to store host data that is directed to a corresponding RAID extent portion of the RAID Logical Address Space 139, that is further mapped by Storage Object Mapping Logic 140 to a portion of an address space of a storage object, such as a portion of an address space of a logical disk within LUN(s) 144.

Each RAID extent entry in the RAID Mapping Table 138 indicates the same number of allocated drive extents, and drive extents are allocated to RAID extent entries in the RAID Mapping Table 138 such that no two drive extents indicated by any single RAID extent entry are located on the same data storage drive.

A drive extent may be released (i.e. deallocated) from a specific RAID extent back to Drive Extent Pool 134, and thereby made available for allocation to a different RAID extent entry, in response to a deallocation request or the like from RAID Group Mapping Logic 136, e.g. when the drive extent is no longer needed to store host data.

When a drive extent is allocated to a RAID extent entry, an indication of the drive extent may be stored into that RAID extent entry. For example, a drive extent allocated to a RAID extent entry may be indicated within that RAID extent entry using a pair of indexes "m|n", in which "m" indicates a drive index of the data storage drive on which the drive extent is located (e.g. a numeric drive number within Drive Group 129, a slot number within which the physical drive located, or a textual drive name, etc.), and "n" indicates an index of the drive extent within the data storage drive (e.g. a numeric drive extent number, a block offset, a sector number, etc.). For example, in embodiments in which data storage drives are indexed within Drive Group 129 starting with 0, and in which drive extents are indexed within the data storage drive that contains them starting with 0, a first drive extent of Drive 0 150 may be represented by "0|0", a second drive extent within Drive 0 150 may be represented by "0|1", and so on.

In the example of FIG. 1, those drive extents in Drive Extent Pool 134 that have previously been allocated to RAID extent entries in the RAID Mapping Table 138 are shown by Allocated Drive Extents 131. Those drive extents in Drive Extent Pool 134 that have not previously been allocated to RAID extent entries in RAID Mapping Table 138 are shown by Free Drive Extents 133.

Host I/O Processing Logic 135 exposes one or more logical storage objects to Hosts 110 for reading and/or writing host data, so that Hosts 110 can issue Host I/O Operations 112 to specific storage objects, e.g. using names or other identifiers of the storage objects. The storage objects that are exposed to Host I/O Operations 112 may be written, read, created, and/or deleted by Hosts 110 through Host I/O Operations 112. The storage objects exposed to Hosts 110 may include or consist of logical disks sometimes referred to as "LUNs", as shown by LUN(s) 144. The storage objects exposed to Hosts 110 may alternatively include or consist of a host file system, virtual volume, and/or some other specific type of storage object, which Host I/O Processing Logic 135 makes accessible to Hosts 110 for reading and/or writing host data.

Storage Object Mapping Logic 140 and/or RAID Mapping Logic 136 may, for example, direct host data written to sets of consecutive blocks in a logical address space of a logical disk in LUN(s) 144 to specific corresponding RAID extents in RAID Logical Address Space 139, so that the host data written to a set of consecutive blocks in the logical address space of the logical disk can be persistently stored by drive extents allocated to and indicated by a corresponding RAID extent entry in RAID Mapping Table 138, and so that parity information can be calculated and stored in at least one of the drive extents indicated by the corresponding RAID extent entry, in order to support data recovery. For example, an address space of a logical disk in LUN(s) 144 may be made up of a set of sequential, equal size logical blocks. Each host write I/O operation may indicate a specific block to be written within the address space of the logical disk, e.g. using a logical block number (e.g. a logical block address) or offset. In some embodiments, 4D+1P RAID-5 block level striping with distributed parity error protection may be used to protect the logical disk, with each RAID stripe consisting of four data blocks and a block of parity information, and each RAID stripe being represented by a single RAID extent entry and mapped to drive extents indicated by that RAID extent entry. In such embodiments, each RAID extent entry in the RAID Mapping Table 138 indicates a total of five drive extents. For each set of four consecutive blocks in the logical address space of the logical disk that are mapped to a single RAID extent in RAID Logical Address Space 139, host data may be striped across the drive extents indicated by the corresponding RAID extent entry by storing host data written to consecutive ones of the four consecutive blocks of the logical address space of the logical disk into different ones of four of the five drive extents indicated by the corresponding RAID extent entry. Parity information may be calculated and stored in the fifth drive extent indicated by the corresponding RAID extent entry, e.g. as an XOR of the host data stored in the other four drive extents indicated by that RAID extent entry. In this way, host data stored in any one of the four drive extents indicated by the RAID extent entry that store host data can be recovered in the event of a failure of a data storage drive containing one of the four drive extents indicated by the RAID extent entry that store host data, for example by performing one or more XOR operations on the data stored in the three surviving drive extents indicated by the RAID extent entry that store host data, in combination with the parity information stored in the fifth drive extent indicated by the RAID extent entry.

In other embodiments, the RAID extent entries in the RAID Mapping Table 138 may each indicate some other fixed number of drive extents. For example, in some embodiments configured to provide 4D+2P RAID-6 protection for LUN(s) 144, each RAID extent entry in the RAID Mapping Table 138 may represent a single data stripe by indicating a total of six drive extents, where each of the six drive extents is located on a different data storage drive in Drive Group 129, and where four of the indicated drive extents are used to store host data written to a portion of the logical disk address space mapped to the corresponding RAID extent in RAID Logical Address Space 139, and two of the indicated drive extents are used to store parity information.

Further during operation, for each host I/O operation directed to LUN(s) 144 (e.g. for each one of Host I/O Operations 112 directed to LUN(s) 144 and received by Storage Processor 120), the I/O Operation Monitoring Logic 162 within Drive Extent End of Life Detection and Proactive Copying Logic 160 performs a monitoring operation that includes incrementing a total I/O operations counter corresponding to a target drive extent to which the I/O operation is directed. The target drive extent to which the I/O operation is directed is a drive extent indicated by a RAID extent entry in the RAID Mapping Table 138 that corresponds to a RAID extent in RAID Logical Address Space 139 that is mapped by Storage Object Mapping Logic 140 to the portion of the address space to which the I/O operation is directed within a logical disk within LUN(s) 144. Accordingly, the target drive extent to which the I/O operation is directed is a drive extent located within one of the data storage drives in Drive Group 129, and from within which the host data indicated by the I/O operation is accessed (in the case of a monitored I/O read operation), or into which the host data indicated by the I/O operation is persistently stored (in the case of a monitored I/O write operation). The total I/O operations counter corresponding to the target drive extent stores a total number of I/O operations that have been directed to the target drive extent.

The monitoring operation performed by the I/O Operation Monitoring Logic 162 may further include receiving, from a data storage drive within which the target drive extent is located (e.g. one of the data storage drives in Drive Group 129), a completion status for the I/O operation. For example, in the case where target drive extent is located within Drive 0 150, I/O Monitoring Logic 162 would receive a completion status for the I/O operation from Drive 0 150.

The monitoring operation performed by the I/O Operation Monitoring Logic 162 may further include detecting that the received completion status for the I/O operation indicates that a soft media error occurred within the data storage drive on which the target drive extent is located while performing the I/O operation on the target drive extent. For example, in the case where the target drive extent is located within Drive 0 150, I/O Monitoring Logic 162 may detect that the completion status for the I/O operation received from Drive 0 150 indicates that a soft media error occurred within Drive 0 150 while the I/O operation was performed on the target drive extent. In response to detecting that the received completion status for the I/O operation indicates that a soft media error occurred within the data storage drive while performing the I/O operation on the target drive extent, the I/O Operation Monitoring Logic 162 may operate to increment a soft media error counter corresponding to the target drive extent. The soft media error counter corresponding to the target drive extent stores a total number of soft media errors that have occurred while performing I/O operations on the target drive extent.

Further in response to detecting that the received completion status for the I/O operation indicates that a soft media error occurred within the data storage drive while performing the I/O operation on the target drive extent, the I/O Operation Monitoring Logic 162 may operate to calculate an error ratio for the target drive extent. In some embodiments, the error ratio for the target drive extent is equal to a ratio of i) a current value of the soft media error counter corresponding to the target drive extent to ii) a current value of the total I/O operations counter corresponding to the target drive extent.

The monitoring operation performed by the I/O Operation Monitoring Logic 162 may further include detecting that the error ratio for the target drive extent exceeds a threshold error ratio. In response to detecting that the error ratio for the target drive extent exceeds a threshold error ratio, the monitoring operation performed by the I/O Operation Monitoring Logic 162 may further include performing, or causing to be performed, a proactive copy operation on the target drive extent that includes allocating a new drive extent, e.g. from Free Drive Extents 133. The proactive copy operation performed on the target drive extent may further include copying all the host data stored on the target drive extent to the newly allocated drive extent, without copying any other host data stored on the data storage drive on which the target drive extent is located. The proactive copy operation performed on the target drive extent may further include modifying a RAID extent entry that stored an indication of the target drive extent in the RAID Mapping Table 138, so that as a result of the modification the RAID extent entry that stored the indication of the target drive extent in the RAID Mapping Table 138 stores an indication of the newly allocated drive extent instead of the indication of the target drive extent. As a result of modifying the RAID extent entry that stored the indication of the target drive extent in the RAID Mapping Table 138 to instead store an indication of the newly allocated drive extent, the host data copied from the target drive extent to the newly allocated drive extent is subsequently accessed by subsequently received I/O operations (e.g. subsequently received ones of the Host I/O Operations 112) on the newly allocated drive extent.

In some embodiments, performing the proactive copy operation on the target drive extent may further include setting a "dead flag" corresponding to the target drive extent. Drive Extent Pool Logic 132 may subsequently operate to prevent the target drive extent from being allocated to any RAID extent entry in the RAID Mapping Table 138 in response to detecting that the dead flag corresponding to the target drive extent has been set.

Further during operation, in some embodiments, Drive End of Life Processing Logic 163 may receive an "end of life" indication from one of the data storage drives in the Drive Group 129. For example, Drive End of Life Processing Logic 163 may receive an "end of life" indication from Drive 0 150. In response to receipt of the end of life indication from a data storage drive, Drive End of Life Processing Logic 163 may perform or cause to be performed proactive copy operations on all drive extents that are located within the data storage drive from which the end of life indication was received. Accordingly, in response to receipt of an end of life indication from Drive 0 150, Drive End of Life Processing Logic 163 may perform or cause to be performed proactive copy operations on all drive extents located on Drive 0 150. In some embodiments, the proactive copy operations performed or caused to be performed by Drive End of Life Processing Logic 163 may only copy host data that is stored on those drive extents located within the data storage drive from which the end of life indication was received that were also allocated to RAID extent entries in the RAID Mapping Table 138, e.g. that are indicated by RAID extent entries in the RAID Mapping Table 138. For example, the proactive copy operations performed or caused to be performed by Drive End of Life Processing Logic 163 may include allocating new drive extents from Free Drive Extents 133 to replace the drive extents located within the data storage drive from which the end of life indication was received that were allocated to RAID extent entries in the RAID Mapping Table 138, and then copying the host data from the drive extents located within the data storage drive from which the end of life indication was received that were allocated to RAID extent entries in the RAID Mapping Table 138 to those newly allocated drive extents. The proactive copy operations performed or caused to be performed by Drive End of Life Processing Logic 163 may further include modifying the RAID extent entries in the RAID Mapping Table 138 that stored indications of drive extents located within the data storage drive from which the end of life indication was received to instead store indications of the newly allocated drive extents. As a result of the modifications made to the RAID extent entries in the RAID Mapping Table 138 that stored the indications of the drive extents located on the data storage drive from which the end of life indication was received, that cause those RAID extent entries to instead store indications of the newly allocated drive extents, the host data copied from the drive extents located on the data storage drive from which the end of life indication was received that were previously allocated to RAID extent entries in the RAID Mapping Table 138 to the newly allocated drive extents is subsequently accessed by subsequently received I/O operations (e.g. subsequently received ones of Host I/O Operations 112) on the newly allocated drive extents.

In some embodiments, the proactive copy operations performed or caused to be performed by the Drive End of Life Processing Logic 163 on all drive extents located within the data storage drive from which the end of life indication was received may further include setting a "dead flag" corresponding to each one of the drive extents located within that data storage drive, including both drive extents that were allocated and drive extents that were not allocated to RAID extent entries in the RAID Mapping Table 138. Drive Extent Pool Logic 132 may subsequently operate to prevent all the drive extents located within the data storage drive from which the end of life indication was received from subsequently being allocated to any RAID extent entry in the RAID Mapping Table 138 in response to detecting that the dead flags corresponding to those drive extents have been set.

In order to advantageously perform proactive data copying at times when resources within the Data Storage System 116 have relatively high availability, so that the performance of Storage Processor 120 with regard to processing Host I/O Operations 112 is not adversely affected, and to avoid performing large amounts of data copying in line with the monitoring of individual I/O operations, some embodiments of the disclosed technology include and use a Background Proactive Copying Process 164 to perform the proactive copying of host data that is performed by the Drive Extent End of Life Detection and Proactive Copying Logic 160. For example, the Background Proactive Copying Process 164 may be scheduled for execution at times when all or at least a significant portion of the shared system resources within Storage Processor 120, such as Processing Circuitry 124, interfaces and/or connections between Storage Processor 120 and Array of Physical Non-Volatile Data Storage Drives 128, etc., are not required or highly utilized by Host I/O Processing Logic 135 to process Host I/O Operations 112. In some embodiments, the proactive copy operation that is performed on the target drive extent by the I/O Operation Monitoring Logic 162 involves the I/O Operation Monitoring Logic 162 simply setting an "end of life" flag corresponding to the target drive extent. In this way, the I/O Operation Monitoring Logic 162 does not have to perform the actual allocation of the new drive extent, copying of the host data from the target drive extent to the newly allocated drive extent, and modifying the RAID extent entry in the RAID Mapping Table 138 to indicate the newly allocated drive extent. Instead, these actions are caused to be performed by the Background Proactive Copying Process 164 when the Background Proactive Copying Process 164 subsequently executes and detects that the end of life flag corresponding to the target drive extent is set. For example, Background Proactive Copying Process 164 checks the end of life flags for each one of the drive extents in the Drive Extent Pool Logic 132, and detects that the end of life flag corresponding to the target drive extent have been set. In response to detecting that the end of life flag corresponding to the target drive extent has been set, Background Proactive Copying Process 164 allocates a new drive extent from Free Drive Extents 133 to replace the target drive extent, copies all the host data stored on the target drive extent to the newly allocated drive extent, and modifies the RAID extent entry that stored an indication of the target drive extent in the RAID Mapping Table 138 to instead store an indication of the newly allocated drive extent.

Similarly, the proactive copy operations that are performed by Drive End of Life Processing Logic 163 on drive extents located in the data storage drive from which an end of life indication is received may involve the Drive End of Life Processing Logic 163 simply setting an "end of life" flag corresponding to each one of the drive extents located in the data storage drive from which the end of life indication was received, that are also allocated to RAID extent entries in the RAID Mapping Table 138. In the case of drive extents located in the data storage drive from which the end of life indication was received that are not allocated to any RAID extent entries in the RAID Mapping Table 138, Drive End of Life Processing Logic 163 may simply set a "dead flag" preventing them from being subsequently allocated. In this way, the Drive End of Life Processing Logic 163 does not have to perform the actual allocations of the new drive extents, copying of the host data from the drive extents to the newly allocated drive extents, and modifying the RAID extent entries in the RAID Mapping Table 138 to indicate the newly allocated drive extents. Instead, these actions are caused to be performed by the Background Proactive Copying Process 164 when the Background Proactive Copying Process 164 subsequently executes and detects that the end of life flags corresponding to the drive extents located on the data storage drive from which the end of life indication was received, and that are allocated to RAID extent entries in the RAID Mapping Table 138. For example, when Background Proactive Copying Process 164 subsequently checks the end of life flags at least for each one of the allocated drive extents in the Drive Extent Pool Logic 132, it detects that the end of life flags corresponding to the drive extents located in the data storage drive from which the end of life indication was received, and that are allocated to RAD extent entries in the RAID Mapping Table 138, have all been set. In response to detecting that the end of life flags corresponding to the drive extents located on the data storage drive from which the end of life indication was received, and that are allocated to RAID extent entries in the RAD Mapping Table 138 have been set, Background Proactive Copying Process 164 allocates new drive extents from Free Drive Extents 133 to replace the drive extents located on the data storage drive from which the end of life indication was received that were allocated to RAID extent entries in the RAID Mapping Table 138, copies the host data stored on the drive extents located on the data storage drive from which the end of life indication was received that were allocated to RAID extent entries in the RAID Mapping Table 138 to the newly allocated drive extents, and modifies the RAID extent entries that stored indications of drive extents located on the data storage drive from which the end of life indication was received to instead store indications of the newly allocated drive extents.

Figure 2:
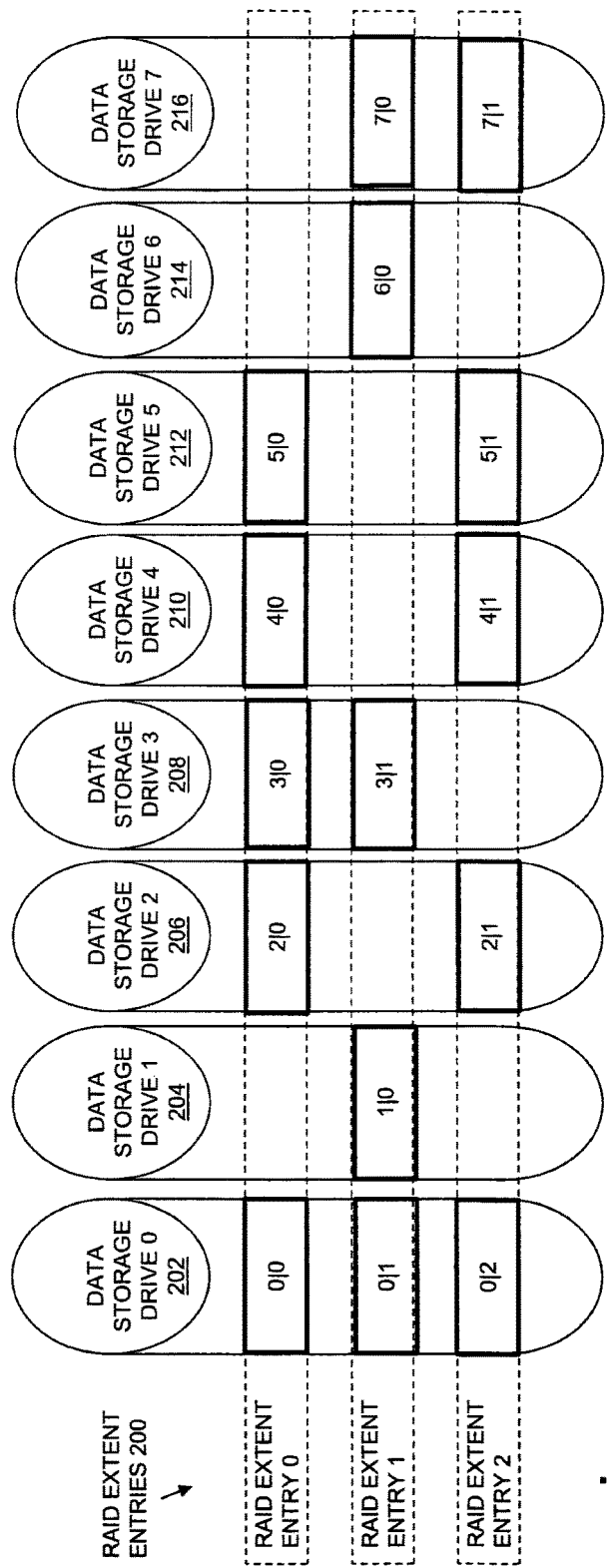
FIG. 2 is a block diagram showing an example of RAID extent entries as may be provided in a RAID mapping table in some embodiments, indicating drive extents that are located on multiple data storage drives.

FIG. 2 is a block diagram showing an example of RAID extent entries in a RAID mapping table. The RAID extent entries shown in FIG. 2 indicate drive extents that are located on data storage drives contained in a group of data storage drives. For example, RAID Extent Entries 200 may be contained in a RAID mapping table in embodiments or configurations that provide mapped 4D+1P RAID-5 striping and data protection. As shown in the example of FIG. 2, RAID Extent Entries 200 include a first RAID Extent Entry 0, a second RAID Extent Entry 1, a third RAID Extent Entry 2, and so on for some total number of RAID extents in the RAID mapping table. For example, each RAID extent entry may be a row with the RAID mapping table. In order to provide 4D+1P RAID-5, each RAID extent entry in RAID Extent Entries 200 indicates a total of five drive extents.

RAID Extent Entry 0 is shown for purposes of illustration indicating a first drive extent 0|0, which is the first drive extent in Data Storage Drive 0 202, a second drive extent 2|0, which is the first drive extent in Data Storage Drive 2 206, a third drive extent 3|0, which is the first drive extent in Data Storage Drive 3 308, a fourth drive extent 4|0, which is the first drive extent in Data Storage Drive 4 310, and a fifth drive extent 5|0, which is the first drive extent in Data Storage Drive 5 212.

RAID Extent Entry 1 is shown for purposes of illustration indicating a first drive extent 0|1, which is the second drive extent in Data Storage Drive 0 202, a second drive extent 1|0, which is the first drive extent in Data Storage Drive 1 204, a third drive extent 3|1, which is the second drive extent in Data Storage Drive 3 208, a fourth drive extent 6|0, which is the first drive extent in Data Storage Drive 6 214, and a fifth drive extent 710, which is the first drive extent in Data Storage Drive 7 216.

RAID Extent Entry 2 is shown for purposes of illustration indicating a first drive extent 0|2, which is the third drive extent in Data Storage Drive 0 202, a second drive extent 2|1, which is the second drive extent in Data Storage Drive 2 206, a third drive extent 4|1, which is the second drive extent in Data Storage Drive 4 210, a fourth drive extent 5|1, which is the second drive extent in Data Storage Drive 5 212, and a fifth drive extent 7|1, which is the second drive extent in Data Storage Drive 7 216.

Figure 3:
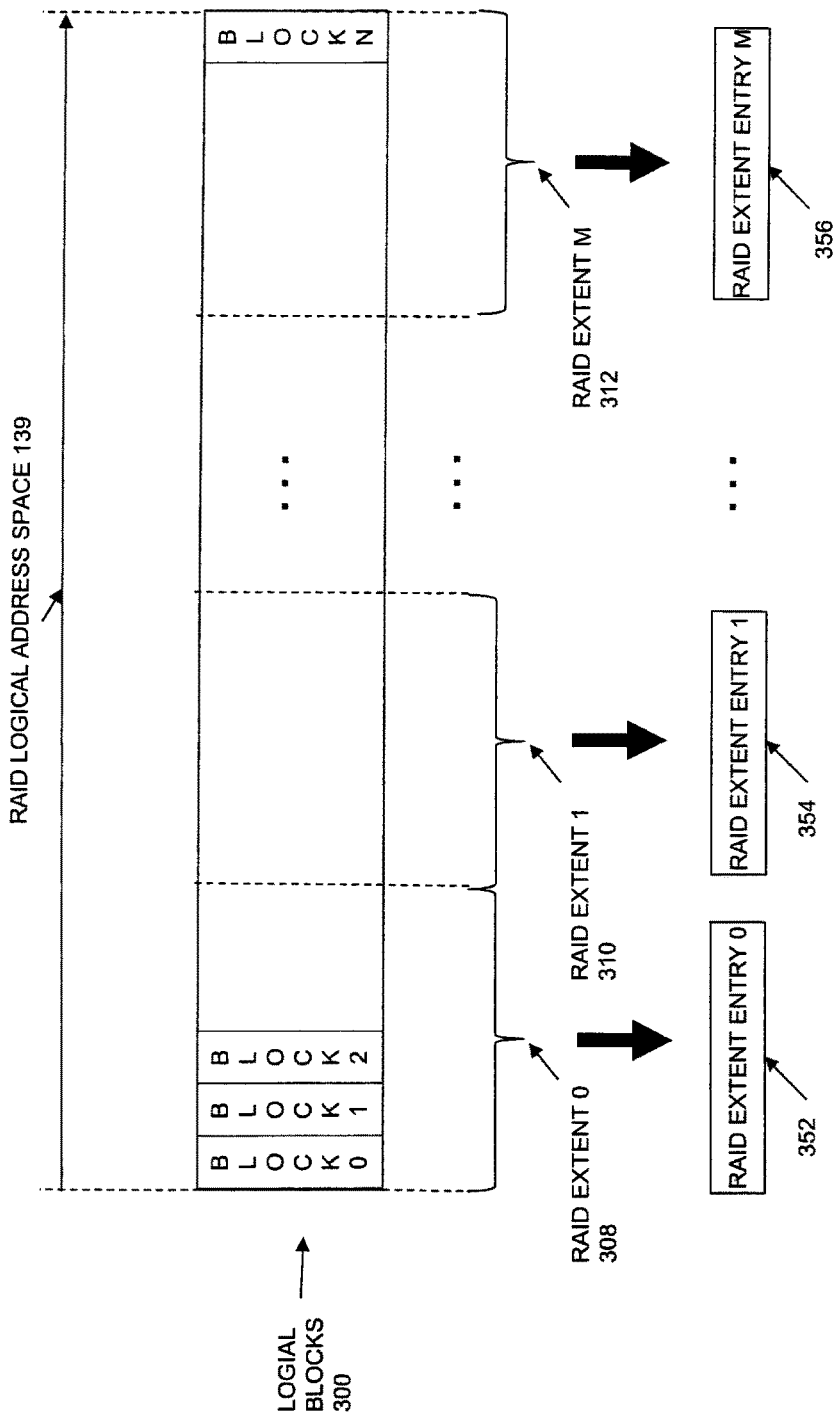
FIG. 3 is a block diagram showing an example of how RAID extent entries in the RAID mapping table may be mapped to a logical address space that is mapped to a storage object in some embodiments.

FIG. 3 is a block diagram showing an example of how RAID extent entries in the RAID mapping table may be mapped to a logical address space that is mapped to a storage object in some embodiments. As shown in FIG. 3, in embodiments using logical block addressing, RAID Logical Address Space 139 may be made up of Logical Blocks 300, including Block 0, Block 1, Block 2, and so on through Block N, each of which correspond to a logical block address or index within the RAID Logical Address Space 139. The blocks within Logical Blocks 300 may each have the same block size. The block size may be equal to or greater than the size of an individual sector of the data storage drives in the Drive Group 129 shown in FIG. 1.

The RAID Logical Address Space 139 is further divided into RAID extents, shown by RAID Extent 0 308, RAID Extent 1 310, and so on through RAID Extent M 312. Each one of the RAID extents in RAID Logical Address Space 139 extends across a set of multiple contiguous logical blocks within the RAID Logical Address Space 139. Accordingly, RAID Extent 0 308 extends across a first set of contiguous logical blocks starting with Block 0, RAID Extent 1 310 extends across a second set of contiguous logical blocks that begins after the logical blocks over which RAID Extent 0 308 extends, and so on through RAID Extent M 312, which extends across a last set of logical blocks in the RAID Logical Address Space 139.

Each of the RAID extents within the RAID Logical Address Space 139 corresponds to a RAID extent entry in the RAID mapping table. For example, RAID Extent 0 308 corresponds to RAID Extent Entry 0 352, RAID Extent 1 310 corresponds to RAID Extent Entry 1 354, and so on through RAID Extent M 312, which corresponds to RAID Extent Entry M 356. During operation of the disclosed technology, the drive extents indicated by a RAID extent entry are used to store host data directed to logical blocks within the address space of LUN(s) 144 that are mapped to the corresponding RAID extent within the RAID Logical Address Space 139, e.g. by Storage Object Mapping Logic 140 and/or RAID Mapping Logic 136. Accordingly, host data written by host write I/O operations directed to logical blocks within an address space of LUN(s) 144 that are mapped to RAID Extent 0 308 is stored in the drive extents indicated by RAID Extent Entry 0 352, host data written by host write I/O operations directed to logical blocks within the address space of LUN(s) 144 that are mapped to RAID Extent 1 310 is stored in the drive extents indicated by RAID Extent Entry 1 354, and so on through host data written by host write I/O operations directed to logical blocks within the address space of LUN(s) 144 that are mapped to the logical blocks contained within RAID Extent M 312, which is stored in the drive extents indicated by RAID Extent Entry M 356.

Figure 4:
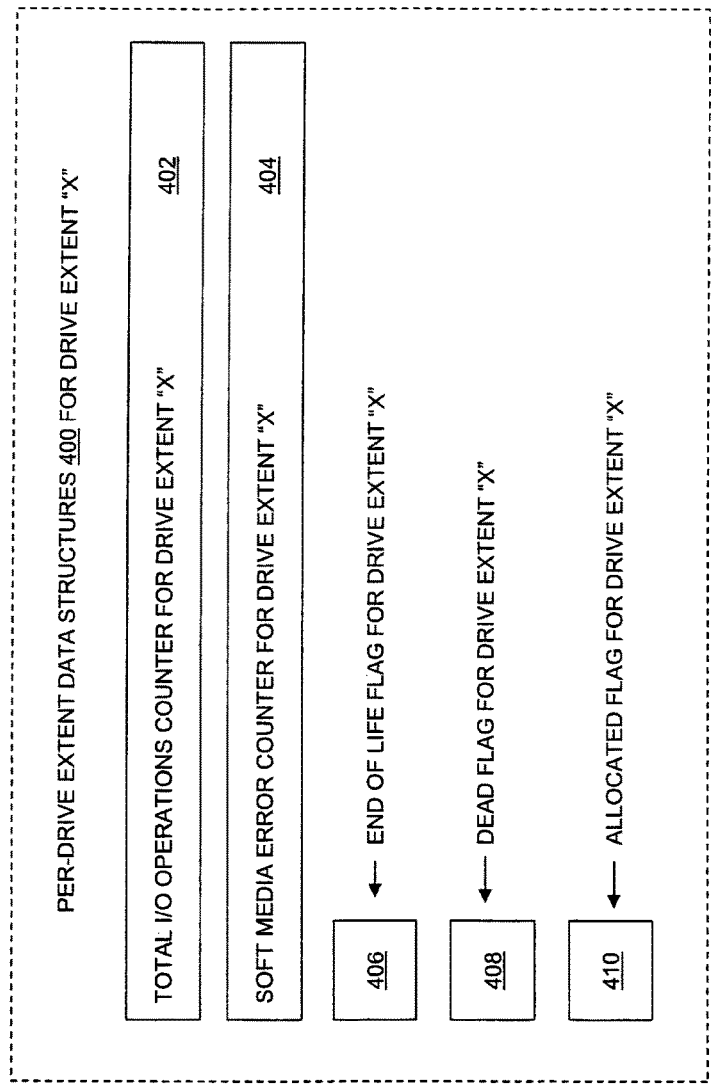
FIG. 4 is a block diagram showing an example of per drive extent data structures that are maintained in some embodiments.

FIG. 4 is a block diagram showing an example of per drive extent data structures that are maintained in some embodiments. In some embodiments, a separate set of the data structures shown in FIG. 4 are maintained for each one of the drive extents in Drive Extent Pool 134. The data structures shown in FIG. 4 are an example of the data structures maintained for a single drive extent "X", and are an example of the data structures maintained for individual drive extents shown in FIG. 1 as Per-Drive Extent Data Structures 166.

In the example of FIG. 4, the Per-Drive Extent Data Structures 400 that are maintained for an example individual drive extent, referred to for purposes of explanation as drive extent "X", include a Total I/O Operations Counter for drive extent "X", a Soft Media Error Counter for drive extent "X", an End of Life Flag 406 for drive extent "X", a Dead Flag 408 for drive extent "X", and a an Allocated Flag 410 for drive extent "X". The value of the Total I/O Operations Counter 402 for drive extent "X" is maintained by the disclosed technology as a value that is equal to the total number of I/O operations that have been directed to the drive extent "X". The value of the Soft Media Error Counter 404 for drive extent "X" is maintained by the disclosed technology as a value that is equal to the total number of soft media errors that have occurred while performing I/O operations on drive extent "X". End of Life Flag 406 for drive extent "X" may be set by I/O Operation Monitoring Logic 162 or Drive End of Life Processing Logic 163 to communicate with Background Proactive Copying Process 164 and indicate that the host data stored on drive extent "X" should be copied to a newly allocated drive extent, and that a RAID extent entry in the RAID Mapping Table 138 that indicates drive extent "X" should be modified to indicate the newly allocated drive extent, and that the after the copying is complete the Dead Flag 408 for drive extent "X" should be set. The Dead Flag 408 for drive extent "X" may be set by Drive End of Life Processing Logic 163 or Background Proactive Copying Process 164 to indicate to Drive Extent Pool Logic 132 that drive extent "X" should not be allocated to any RAID extent entry in the RAID Mapping Table 138.

Figure 5:
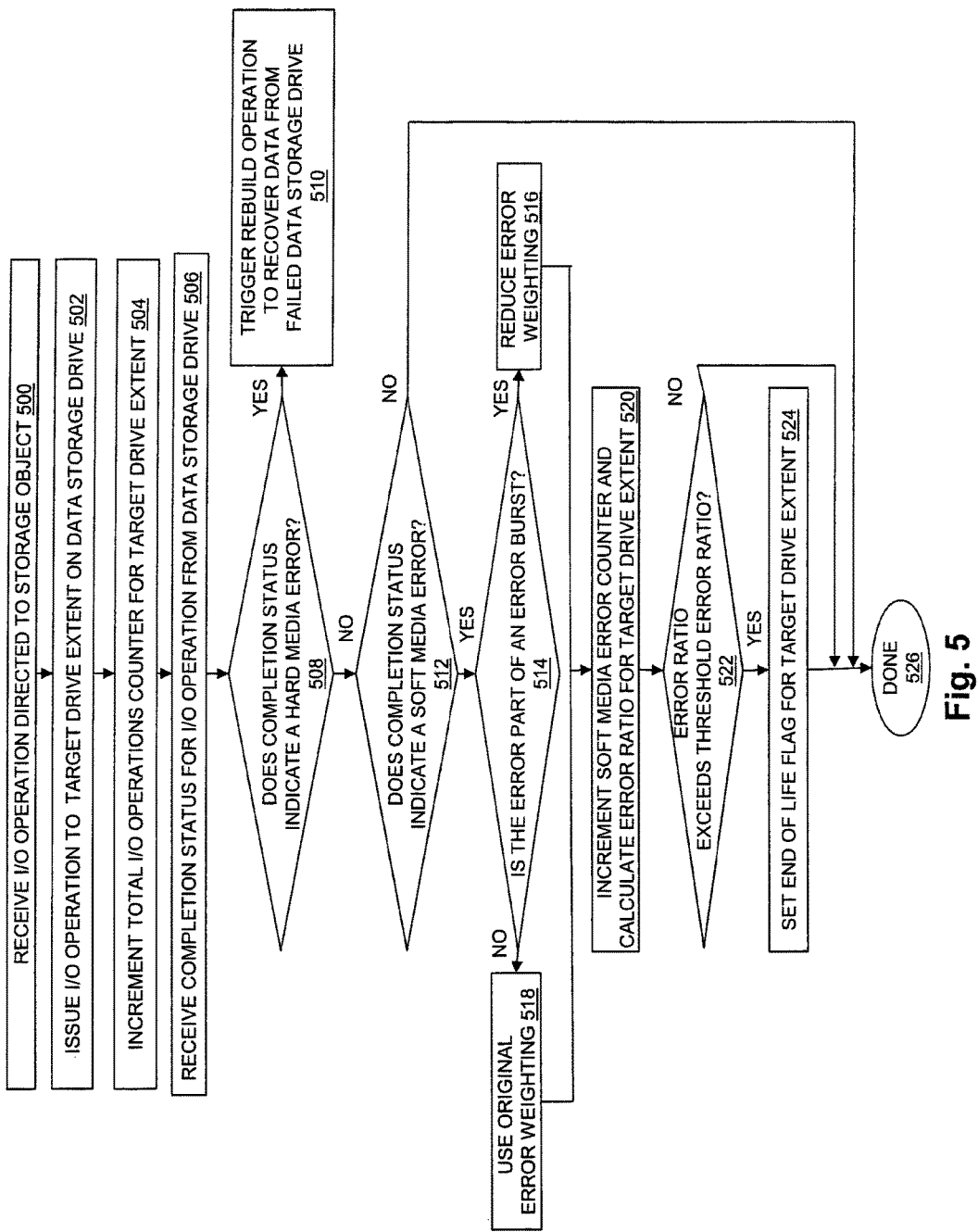
FIG. 5 is a flow chart showing an example of steps performed by a storage processor in some embodiments to monitor I/O operations and the completion status of each monitored I/O operation.

FIG. 5 is a flow chart showing an example of steps performed by a storage processor in some embodiments to monitor I/O operations and the completion status of each monitored I/O operation. The steps of FIG. 5 may, for example, be performed during operation of the Host I/O Processing Logic 135.

At step 500, an I/O operation directed to a storage object is received. For example, one of Host Operations 112 directed to LUN(s) 144 may be received by Storage Processor 120.

At step 502, the I/O operation is issued to a target drive extent located on a data storage drive within the data storage system. For example, Storage Object Mapping Logic 140 may determine a logical block within the RAID Logical Address Space 139 that is mapped to a logical block within an address space of a logical disk within the LUN(s) 144 to which the received I/O operation is directed. RAID Mapping Logic 136 may use RAID Mapping Table 138 to locate a RAID extent entry corresponding to the RAID extent that contains that logical block within the RAID Logical Address Space 139. The RAID Mapping Logic 136 may then determine a specific drive extent indicated by that RAID extent entry that is used to store host data directed to that logical block within the RAID Logical Address Space 139, and then cause that drive extent to be used as the target drive extent to which the I/O operation is issued at step 502.

At step 504, the I/O Operation Monitoring Logic 162 increments the total I/O operations counter for the target drive extent.

At step 506, the I/O Operation Monitoring Logic 162 receives a completion status for the I/O operation from the data storage drive on which the target drive extent is located.

At step 508, the I/O Operation Monitoring Logic 162 determines whether the completion status received at step 506 indicates that a hard media error has occurred that cannot be recovered from. If at step 508 it is determined that the completion status received at step 506 indicates that a hard media error has occurred that cannot be recovered from, then step 508 is followed by step 510, in which a rebuild operation is triggered for the data storage drive on which the target drive extent is located. The rebuild operation triggered at step 510 may, for example, recover the data stored on the data storage drive on which the target drive extent is located using host data and parity data in other drive extents indicated by the same RAID extent entry that indicated the target drive extent in the RAID Mapping Table 138.

Otherwise, if at step 508 it is determined that the completion status received at step 506 does not indicate that a hard media error has occurred, then step 508 is followed by step 512, in which I/O Operation Monitoring Logic 162 determines whether the completion status received at step 506 indicates that a soft media error has occurred. If at step 512 it is determined that a soft media error has not occurred, then step 512 is followed by step 526, and monitoring of the I/O operation is done. Otherwise, if at step 512 it is determined that a soft media error has occurred, then step 512 is followed by step 514.

At step 514, I/O Operation Monitoring Logic 162 determines whether the soft media error is part of an error burst. For example, if less than 100 milliseconds has passed since a previous soft media error occurred, then the soft media error is determined to be part of an error burst, and step 514 is followed by step 516. Otherwise step 514 is followed by step 518.

In step 516, I/O Operation Monitoring Logic 162 reduces the error weighting associated with the soft media error. For example, in some embodiments, the completion status received at step 506 may include both an indication that a soft media error occurred, and an associated error weighting that indicates a level of the severity of the soft media error, and that may be reduced in the case where a soft media error is received as part of a burst of errors.

In step 516, I/O Operation Monitoring Logic 162 reduces the error weighting associated with the soft media error by a predetermined percentage, e.g. by 20 percent. By reducing the error weighting, the disclosed technology can avoid setting a drive extent to be end of life based on a burst of errors that occurred within a very short period of time.

In step 518, no reduction of the weighting associated with the soft media error is performed. Steps 516 and 518 are followed by step 520.

At step 520, I/O Operation Monitoring Logic 162 increments the soft media error counter for the target drive extent and calculates an error ratio for the target drive extent. For example, in some embodiments, the soft media error counter corresponding to the target drive extent may be incremented by the weight associated with the soft media error. The error ratio may, for example, be a ratio of the current value of the soft media error counter corresponding to the target drive extent to a current value of the total I/O operations counter corresponding to the target drive extent.

For example, in some embodiments, the total I/O operations counter for the target drive extent may be initialized to a large initial value, such as 1000000:

$$total\_IO\_operations\_counter=1000000$$

The soft media error counter for the target drive extent may then be initialized, in step 520 at a subsequent point in time when a first soft media error occurs with regard to an I/O operation directed to the target drive extent, to a value that is equal to a difference between a current value of the total I/O operations counter for the target drive extent at that time and a predetermined "interval" value:

$$soft\_media\_error\_counter=total\_IO\_operations\_counter-interval$$

where the value of "interval" may, for example, be 1000000. The value of "interval" represents a window of time over which the error ratio is calculated, and must not be larger than the initial value to which the total I/O operations counter is set.

For each subsequent soft media error that occurs with regard to an I/O operation directed to the target drive extent, the soft media error counter for the target drive extent may be incremented at step 520 by the error weighting associated with the soft media error:

$$soft\_media\_error\_counter+=error\_weighting$$

Note that as described above, in the case of an error burst, the value for "error_weighting" may have been reduced prior to step 520 at step 516 by a predetermined percentage. For example, in some embodiments, the original (not reduced) value of "error_weighting" may be 36000.

The error ratio may then be calculated by the I/O Operation Monitoring Logic 162 at step 520 as a percentage value between 0 and 100 as follows:

$$error\_ratio=(1-(total\_IO\_operations\_counter-soft\_media\_error\_counter)/interval)*100$$

In the example above, the resulting error ratio, i.e. the value for "error_ratio", is calculated as a percentage value between 0 and 100. At step 522, I/O Operation Monitoring Logic 162 compares the value of the error ratio calculated at step 520 with a predetermined or configured threshold error ratio, which may also be a value between 0 and 100, e.g. 89. If the error ratio calculated at step 520 does not exceed the threshold error ratio, then step 522 is followed by step 526, and monitoring of the I/O operation is done. Otherwise, if the error ratio calculated at step 520 does exceed the threshold error ratio, then step 522 is followed by step 524, in which the I/O Operation Monitoring Logic 162 sets the "end of life" flag for the target drive extent. Step 524 is followed by step 526, and monitoring of the I/O operation is done.

Figure 6:
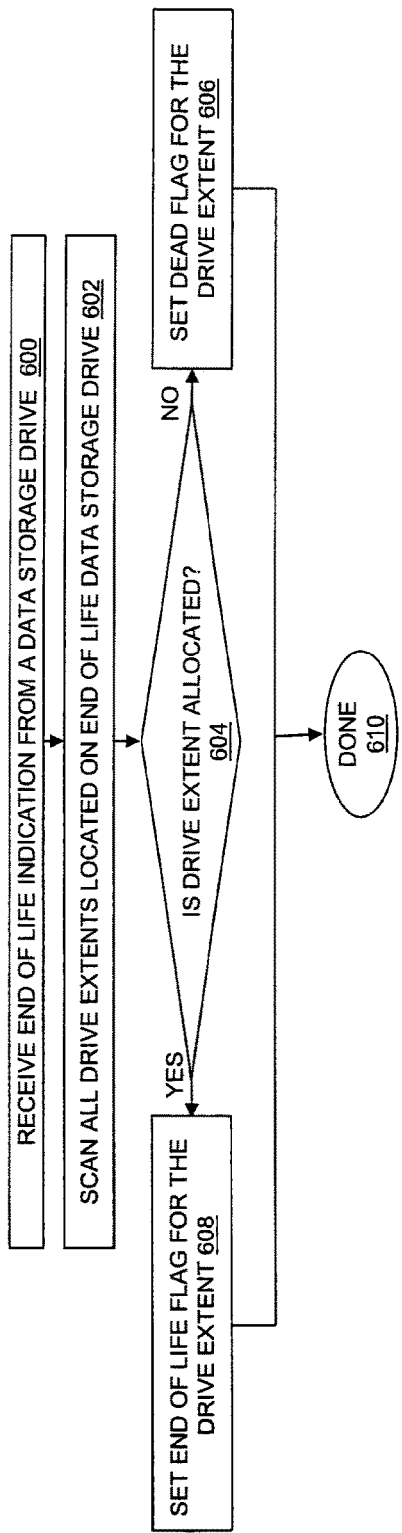
FIG. 6 is a flow chart showing an example of steps performed in response to receipt, by a storage processor from a data storage drive, of an indication that a data storage drive has an "end of life" status.

FIG. 6 is a flow chart showing an example of steps performed in response to receipt, by a storage processor from a data storage drive, of an indication that the data storage drive has an "end of life" status. The steps of FIG. 6 may, for example, be performed during operation of the Host I/O Processing Logic 135.

At step 600, Drive End of Life Processing Logic 163 in Drive Extent End of Life Detection and Proactive Copying Logic 160 receives an "end of life" indication from a data storage drive in the data storage system, e.g. one of the data storage drives in the Drive Group 129 shown in FIG. 1.

At step 602, Drive End of Life Processing Logic 163 scans all drive extents located on the data storage drive from which the "end of life" indication was received at step 600, in order to determine whether each drive extent located on the data storage drive from which the "end of life" indication was received is currently allocated.

At step 604, for each drive extent located on the data storage drive from which the "end of life" indication was received, Drive End of Life Processing Logic 163 determines whether the drive extent is currently allocated. For example, Drive End of Life Processing Logic 163 may check the status of an "allocated" flag or the like (see FIG. 4) associated with each drive extent located on the data storage drive from which the "end of life" indication was received. In the case where the "allocated" flag for a drive extent is set, then the drive extent is currently allocated to a RAID extent entry in RAID Mapping Table 138, and step 604 is followed by step 608, in which Drive End of Life Processing Logic 163 sets an "end of life" flag or the like (see FIG. 4) for the drive extent, which indicates to the Background Proactive Copying Process 164 that a proactive copying operation should be performed with regard to that drive extent. Otherwise, in the case where the "allocated" flag for a drive extent is not set, then the drive extent is not currently allocated, and step 604 is followed by step 606, in which Drive End of Life Processing Logic 163 sets a "dead" flag or the like (see FIG. 4) for the drive extent, which indicates to Drive Extent Pool Logic 132 that the drive extent should not subsequently be allocated to any RAID extent entry in the RAID Mapping Table 138. Following steps 606 and 608 processing of the "end of life" indication by Drive End of Life Processing Logic 163 is done at step 610.

Figure 7:
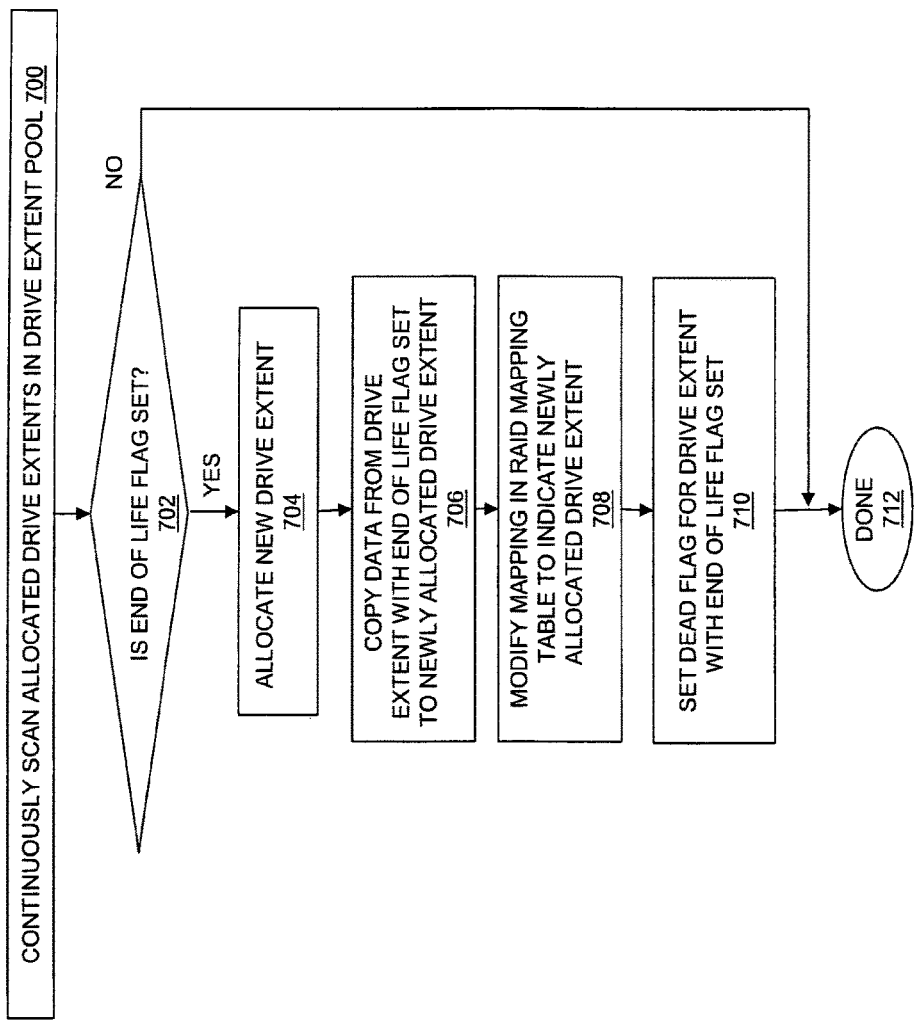
FIG. 7 is a flow chart showing an example of steps performed in some embodiments by a background process executing in a storage processor to scan the end of life flags of drive extents and to perform proactive copying on a per drive extent basis in response to detected set end of life flags.

FIG. 7 is a flow chart showing an example of steps performed in some embodiments by a background process executing in a storage processor to scan end of life flags of drive extents and to perform proactive copying on a per drive extent basis in response to detected set end of life flags. The steps of FIG. 7 may, for example, be performed during operation of the Host I/O Processing Logic 135.

At step 700, Background Proactive Copying Process 164 in Host I/O Processing Logic 135 scans the drive extents within the Allocated Drive Extents 131 in Drive Extent Pool 134. For example, each one of the drive extents within the Allocated Drive Extents 131 may have an associated "allocated" flag or the like that is set. The steps 702, 704, 706, 708, and 710 are performed by Background Proactive Copying Process 164 for each one of the drive extents in Allocated Drive Extents 131.

At step 702, Background Proactive Copying Process 164 determines whether the "end of life" flag for the drive extent is currently set. If not, then step 702 is followed by step 712 and processing of the drive extent by Background Proactive Copying Process 164 is done. Otherwise, if the "end of life" flag for the drive extent is currently set, then step 702 is followed by step 704.

At step 704, Background Proactive Copying Process 164 allocates a new drive extent from the Drive Extent Pool 134, e.g. from Free Drive Extents 133.

At step 706, Background Proactive Copying Process 164 copies the host data stored on the drive extent to the newly allocated drive extent.

At step 708, Background Proactive Copying Process 164 modifies a RAID extent entry in the RAID Mapping Table 138 that indicates the drive extent to instead indicate the newly allocated drive extent.

At step 710, Background Proactive Copying Process 164 sets a "dead" flag associated with the drive extent, thus preventing the drive extent from being subsequently allocated to any RAID extent entry in the RAID Mapping Table 138.

After step 710 processing of the drive extent is done at step 712.

Figure 8:
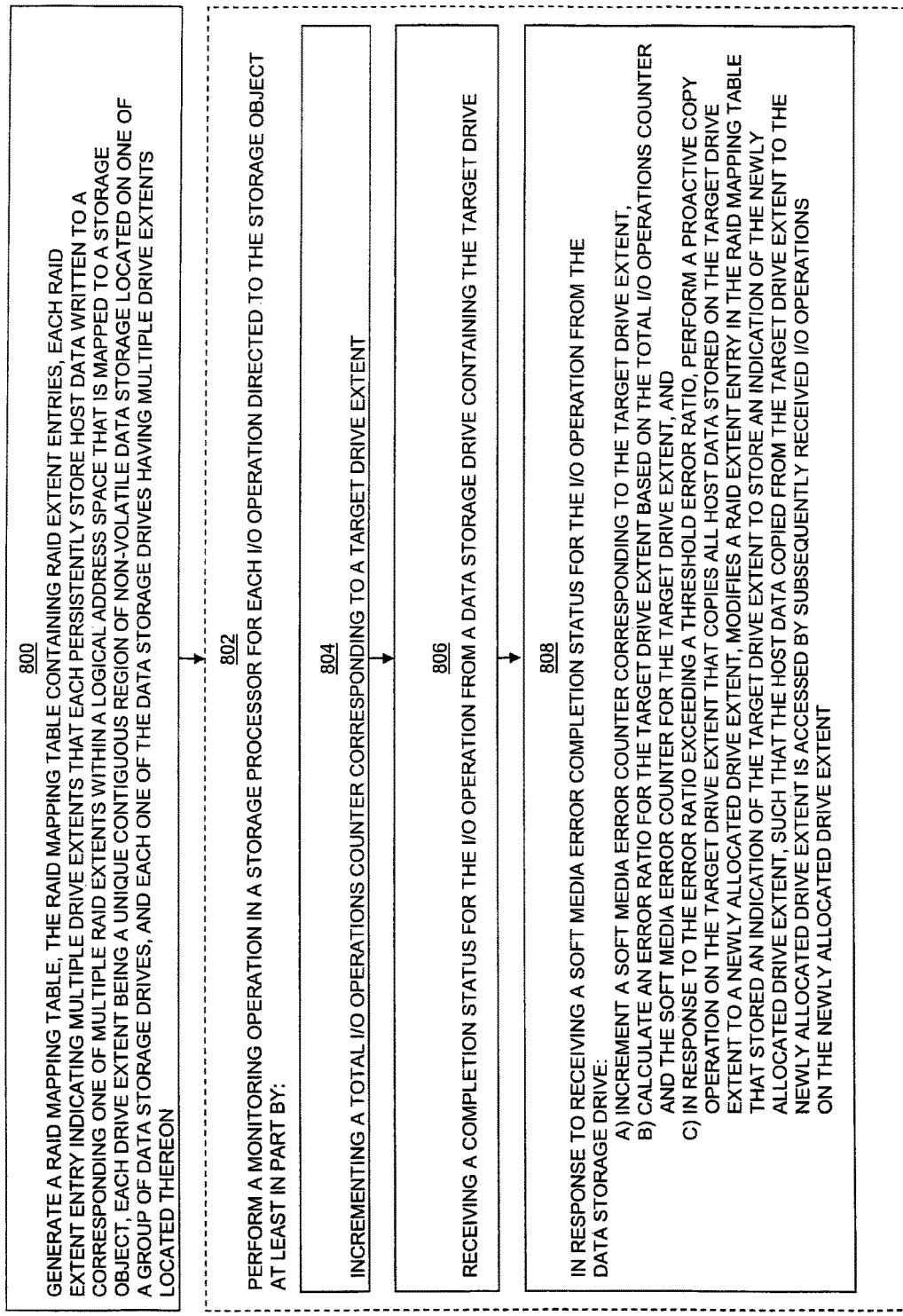
FIG. 8 is another flow chart showing an example of steps performed in some embodiments.

FIG. 8 is another flow chart showing an example of steps performed in some embodiments. The steps of FIG. 8 may, for example, be performed during operation of the Drive Extent End of Life Detection and Proactive Copying Logic 160.

At step 800, a RAID mapping table is generated in storage processor of a data storage system. The RAID mapping table generated at step 800 contains multiple RAID extent entries. Each one of the RAID extent entries contained in the RAID mapping table indicates multiple drive extents that each persistently store host data written to a corresponding RAID extent within a logical address space that is mapped to a storage object. Each drive extent is a unique contiguous region of non-volatile data storage located on one of a group of data storage drives. Each one of the data storage drives has multiple drive extents located thereon.

At step 802, a monitoring operation is performed by the storage processor for each I/O operation directed to the storage object, e.g. for each host I/O operation directed to the storage object and received by the storage processor. The monitoring operation performed at step 802 includes steps 804, 806, and 808.

At step 804, a total I/O operations counter is incremented that corresponds to a target drive extent to which the I/O operation is directed.

At step 806, a completion status for the I/O operation is received from a data storage drive that contains the target drive extent.

At step 808, in response to receiving a soft media error completion status for the I/O operation from the data storage drive:

a) a soft media error counter corresponding to the target drive extent is incremented, b) an error ratio for the target drive extent is calculated based on the total I/O operations counter and the soft media error counter for the target drive extent, and c) in response to the error ratio exceeding a threshold error ratio, a proactive copy operation is performed on the target drive extent that copies all host data stored on the target drive extent to a newly allocated drive extent, modifies a RAID extent entry in the raid mapping table that stored an indication of the target drive extent to store an indication of the newly allocated drive extent, such that the host data copied from the target drive extent to the newly allocated drive extent is accessed by subsequently received I/O operations on the newly allocated drive extent.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, without limitation, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms, including without limitation: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for at least one storage object in a data storage system, wherein the data storage system includes at least one storage processor and an array of data storage drives communicably coupled to the storage processor, the method comprising:

generating a RAID mapping table, wherein the RAID mapping table contains a plurality of RAID extent entries, wherein each RAID extent entry contained in the RAID mapping table indicates a predetermined total number of drive extents that each persistently store host data written to a corresponding one of a plurality of RAID extents within a logical address space that is mapped to the at least one storage object, wherein each drive extent comprises a unique contiguous region of non-volatile data storage located on one of the data storage drives, and wherein each one of the data storage drives has multiple drive extents located thereon;

for each I/O operation directed to the storage object, performing a monitoring operation by the storage processor, wherein the monitoring operation includes:

i) incrementing a total I/O operations counter corresponding to a target drive extent to which that I/O operation is directed, wherein the total I/O operations counter corresponding to the target drive extent stores a total number of I/O operations that have been directed to the target drive extent, ii) receiving, from a data storage drive within which the target drive extent is located, a completion status for that I/O operation, and iii) in response to detecting that the received completion status for that I/O operation indicates that a soft media error occurred within the data storage drive while performing that I/O operation on the target drive extent:

a) incrementing a soft media error counter corresponding to the target drive extent, wherein the soft media error counter corresponding to the target drive extent stores a total number of soft media errors that have occurred while performing I/O operations on the target drive extent, b) calculating an error ratio for the target drive extent, wherein the error ratio for the target drive extent comprises a ratio of a current value of the soft media error counter corresponding to the target drive extent to a current value of the total I/O operations counter corresponding to the target drive extent, and c) in response to detecting that the error ratio for the target drive extent exceeds a threshold error ratio, performing a proactive copy operation on the target drive extent that copies all host data stored on the target drive extent to a newly allocated drive extent, wherein performing the proactive copy operation on the target drive extent also modifies a RAID extent entry in the RAID mapping table that stored an indication of the target drive extent to store an indication of the newly allocated drive extent, whereby the host data copied from the target drive extent to the newly allocated drive extent is accessed by subsequently received I/O operations on the newly allocated drive extent.

2. The method of claim 1, wherein performing the proactive copy operation on the target drive extent further includes setting a dead flag corresponding to the target drive extent, and wherein the method further comprises:

responsive to the dead flag corresponding to the target drive extent being set, preventing the target drive extent from subsequently being allocated to any RAID mapping table entry in the RAID mapping table.

3. The method of claim 2, further comprising:

receiving an end of life indication from the data storage drive; and in response to receiving the end of life indication from the data storage drive, performing proactive copy operations on drive extents located within the data storage drive, wherein the proactive copy operations only copy host data stored on those drive extents located within the data storage drive that are indicated by particular RAID extent entries in the RAID mapping table to newly allocated drive extents, and wherein the proactive copy operations also modify the particular RAID extent entries in the RAID mapping table that stored indications of the drive extents located within the data storage drive to store indications of the newly allocated drive extents, whereby the host data copied from the drive extents located within the data storage drive that were indicated by RAID extent entries in the RAID mapping table to the newly allocated drive extents is subsequently accessed by subsequently received I/O operations on the newly allocated drive extents.

4. The method of claim 3, wherein performing proactive copy operations on all drive extents located within the data storage drive further includes setting a dead flag corresponding to each one of the drive extents located within the data storage drive, and wherein the method further comprises:

responsive to the dead flag corresponding to each one of the drive extents located within the data storage drive being set, preventing the drive extents located within the data storage drive from subsequently being allocated to any RAID mapping table entry in the RAID mapping table.

5. The method of claim 4, wherein performing the proactive copy operation on all drive extents located within the data storage drive further comprises:

setting an end of life flag corresponding to each one of the drive extents that are located within the data storage drive and that are also indicated by RAID extent entries in the RAID mapping table;

detecting, by a background process, the set end of life flags corresponding to the drive extents that are located within the data storage drive and that are also indicated by RAID extent entries in the RAID mapping table; and in response to detecting, by the background process, the set end of life flags corresponding to the drive extents that are located within the data storage drive and that are also indicated by RAID extent entries in the RAID mapping table, copying, by the background process, all the host data stored on drive extents that are located within the data storage drive and that are also indicated by RAID extent entries in the RAID mapping table to the newly allocated drive extents, and modifying, by the background process, each one of the RAID extent entries in the RAID mapping table that stored an indication of one of the drive extents located within the data storage drive to instead store an indication of one of the newly allocated drive extents.

6. The method of claim 3, wherein the data storage drive within which the target drive extent is located includes a set of reserved disk sectors that are used to replace failed disk sectors; and wherein the received completion status for that I/O operation that indicates that a soft media error occurred within the data storage drive while performing that I/O operation on the target drive extent indicates that one of the set of reserved disk sectors was used to replace an original disk sector to which that I/O operation was directed within the target drive extent, in response to a failure of the original disk sector.

7. The method of claim 6, wherein the end of life indication received from the data storage drive indicates that a threshold maximum number of the reserved disk sectors have been used to replace original disk sectors to which I/O operations were directed, in response to failures of the original disk sectors.

8. The method of claim 7, wherein the threshold maximum number of the reserved disk sectors comprises the total number of reserved disk sectors in the data storage drive.

9. The method of claim 2, wherein performing the proactive copy operation on the target drive extent further comprises:

setting an end of life flag corresponding to the target drive extent;

detecting, by a background process, the set end of life flag corresponding to the target drive extent; and in response to detecting the set end of life flag corresponding to the target drive extent, copying, by the background process, all the host data stored on the target drive extent to the newly allocated drive extent, and modifying, by the background process, the RAID extent entry in the RAID mapping table that stored an indication of the target drive extent to store an indication of the newly allocated drive extent.

10. A data storage system that provides RAID (Redundant Array of Independent Disks) data protection for a storage object, comprising:

at least one storage processor including processing circuitry and a memory;

an array of data storage drives communicably coupled to the at least one storage processor; and wherein the memory has program code stored thereon, wherein the program code, when executed by the processing circuitry, causes the processing circuitry to:

generate a RAID mapping table, wherein the RAID mapping table contains a plurality of RAID extent entries, wherein each RAID extent entry contained in the RAID mapping table indicates a predetermined total number of drive extents that each persistently store host data written to a corresponding one of a plurality of RAID extents within a logical address space that is mapped to the storage object, wherein each drive extent comprises a unique contiguous region of non-volatile data storage located on one of the data storage drives, and wherein each one of the data storage drives has multiple drive extents located thereon;

for each I/O operation directed to the storage object, perform a monitoring operation by the storage processor, at least in part by causing the processing circuitry to:

i) increment a total I/O operations counter corresponding to a target drive extent to which that I/O operation is directed, wherein the total I/O operations counter corresponding to the target drive extent stores a total number of I/O operations that have been directed to the target drive extent, ii) receive, from a data storage drive within which the target drive extent is located, a completion status for that I/O operation, and iii) in response to detecting that the received completion status for that I/O operation indicates that a soft media error occurred within the data storage drive while performing that I/O operation on the target drive extent:

a) increment a soft media error counter corresponding to the target drive extent, wherein the soft media error counter corresponding to the target drive extent stores a total number of soft media errors that have occurred while performing I/O operations on the target drive extent, b) calculate an error ratio for the target drive extent, wherein the error ratio for the target drive extent comprises a ratio of a current value of the soft media error counter corresponding to the target drive extent to a current value of the total I/O operations counter corresponding to the target drive extent, and c) in response to detecting that the error ratio for the target drive extent exceeds a threshold error ratio, perform a proactive copy operation on the target drive extent that copies all host data stored on the target drive extent to a newly allocated drive extent, wherein performing the proactive copy operation on the target drive extent also modifies a RAID extent entry in the RAID mapping table that stored an indication of the target drive extent to store an indication of the newly allocated drive extent, whereby the host data copied from the target drive extent to the newly allocated drive extent is accessed by subsequently received I/O operations on the newly allocated drive extent.

11. The data storage system of claim 10, wherein the program code, when executed by the processing circuitry, further causes the processing circuitry to:

perform the proactive copy operation on the target drive extent at least in part by also setting a dead flag corresponding to the target drive extent; and responsive to the dead flag corresponding to the target drive extent being set, prevent the target drive extent from subsequently being allocated to any RAID mapping table entry in the RAID mapping table.

12. The data storage system of claim 11, wherein the program code, when executed by the processing circuitry, further causes the processing circuitry to:
receive an end of life indication from the data storage drive; and
in response to receiving the end of life indication from the data storage drive, perform proactive copy operations on drive extents located within the data storage drive, wherein the proactive copy operations only copy host data stored on those drive extents located within the data storage drive that are indicated by particular RAID extent entries in the RAID mapping table to newly allocated drive extents, and wherein the proactive copy operations also modify the particular RAID extent entries in the RAID mapping table that stored indications of the drive extents located within the data storage drive to store indications of the newly allocated drive extents, whereby the host data copied from the drive extents located within the data storage drive that were indicated by RAID extent entries in the RAID mapping table to the newly allocated drive extents is subsequently accessed by subsequently received I/O operations on the newly allocated drive extents.

13. The data storage system of claim 12, wherein the program code, when executed by the processing circuitry, further causes the processing circuitry to:
perform proactive copy operations on all drive extents located within the data storage drive at least in part by also setting a dead flag corresponding to each one of the drive extents located within the data storage drive; and
responsive to the dead flag corresponding to each one of the drive extents located within the data storage drive being set, prevent the drive extents located within the data storage drive from subsequently being allocated to any RAID mapping table entry in the RAID mapping table.

14. The data storage system of claim 13, wherein the program code, when executed by the processing circuitry, further causes the processing circuitry to perform the proactive copy operation on all drive extents located within the data storage drive by further causing the processing circuitry to:
set an end of life flag corresponding to each one of the drive extents that are located within the data storage drive and that are also indicated by RAID extent entries in the RAID mapping table;
detect, by a background process, the set end of life flags corresponding to the drive extents that are located within the data storage drive and that are also indicated by RAID extent entries in the RAID mapping table; and
in response to detecting, by the background process, the set end of life flags corresponding to the drive extents that are located within the data storage drive and that are also indicated by RAID extent entries in the RAID mapping table, copy, by the background process, all the host data stored on drive extents that are located within the data storage drive and that are also indicated by RAID extent entries in the RAID mapping table to the newly allocated drive extents, and modify, by the background process, each one of the RAID extent entries in the RAID mapping table that stored an indication of one of the drive extents located within the data storage drive to instead store an indication of one of the newly allocated drive extents.

15. The data storage system of claim 12, wherein the data storage drive within which the target drive extent is located includes a set of reserved disk sectors that are used to replace failed disk sectors; and
wherein the received completion status for that I/O operation that indicates that a soft media error occurred within the data storage drive while performing that I/O operation on the target drive extent indicates that one of the set of reserved disk sectors was used to replace an original disk sector to which that I/O operation was directed within the target drive extent, in response to a failure of the original disk sector.

16. The data storage system of claim 15, wherein the end of life indication received from the data storage drive indicates that a threshold maximum number of the reserved disk sectors have been used to replace original disk sectors to which I/O operations were directed, in response to failures of the original disk sectors.

17. The data storage system of claim 16, wherein the threshold maximum number of the reserved disk sectors comprises the total number of reserved disk sectors in the data storage drive.

18. The data storage system of claim 11, wherein the program code, when executed by the processing circuitry, further causes the processing circuitry to perform the proactive copy operation on the target drive extent at least in part by further causing the processing circuitry to:
set an end of life flag corresponding to the target drive extent;
detect, by a background process, the set end of life flag corresponding to the target drive extent; and
in response to detecting the set end of life flag corresponding to the target drive extent, copy, by the background process, all the host data stored on the target drive extent to the newly allocated drive extent, and modifying, by the background process, the RAID extent entry in the RAID mapping table that stored an indication of the target drive extent to store an indication of the newly allocated drive extent.

19. A non-transitory computer readable medium for providing RAID (Redundant Array of Independent Disks) data protection for a storage object in a data storage system, wherein the data storage system includes a storage processor and an array of data storage drives communicably coupled to the storage processor, the non-transitory computer readable medium comprising instructions stored thereon that when executed on processing circuitry in the storage processor perform the steps of:
generating a RAID mapping table, wherein the RAID mapping table contains a plurality of RAID extent entries, wherein each RAID extent entry contained in the RAID mapping table indicates a predetermined total number of drive extents that each persistently store host data written to a corresponding one of a plurality of RAID extents within a logical address space that is mapped to the storage object, wherein each drive extent comprises a unique contiguous region of non-volatile data storage located on one of the data storage drives, and wherein each one of the data storage drives has multiple drive extents located thereon;
for each I/O operation directed to the storage object, performing a monitoring operation by the storage processor, wherein the monitoring operation includes:
i) incrementing a total I/O operations counter corresponding to a target drive extent to which that I/O operation is directed, wherein the total I/O operations counter corresponding to the target drive extent stores a total number of I/O operations that have been directed to the target drive extent, ii) receiving, from a data storage drive within which the target drive extent is located, a completion status for that I/O operation, and iii) in response to detecting that the received completion status for that I/O operation indicates that a soft media error occurred within the data storage drive while performing that I/O operation on the target drive extent:

a) incrementing a soft media error counter corresponding to the target drive extent, wherein the soft media error counter corresponding to the target drive extent stores a total number of soft media errors that have occurred while performing I/O operations on the target drive extent, b) calculating an error ratio for the target drive extent, wherein the error ratio for the target drive extent comprises a ratio of a current value of the soft media error counter corresponding to the target drive extent to a current value of the total I/O operations counter corresponding to the target drive extent, and c) in response to detecting that the error ratio for the target drive extent exceeds a threshold error ratio, performing a proactive copy operation on the target drive extent that copies all host data stored on the target drive extent to a newly allocated drive extent, wherein performing the proactive copy operation on the target drive extent also modifies a RAID extent entry in the RAID mapping table that stored an indication of the target drive extent to store an indication of the newly allocated drive extent, whereby the host data copied from the target drive extent to the newly allocated drive extent is accessed by subsequently received I/O operations on the newly allocated drive extent.

\* \* \* \* \*